(12) United States Patent
Steinman et al.

(10) Patent No.: US 7,957,428 B2
(45) Date of Patent: Jun. 7, 2011

(54) METHODS AND APPARATUSES TO EFFECT A VARIABLE-WIDTH LINK

(75) Inventors: Maurice B. Steinman, Marlborough, MA (US); Rahul R. Shah, Marlborough, MA (US); Naveen Cherukuri, San Jose, CA (US); Aaron T. Spink, San Francisco, CA (US); Allen J. Baum, Palo Alto, CA (US); Sanjay Dabral, Palo Alto, CA (US); Tim Frodsham, Portland, OR (US); David S. Dunning, Portland, OR (US); Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 10/850,809

(22) Filed: May 21, 2004

(65) Prior Publication Data

US 2005/0259696 A1    Nov. 24, 2005

(51) Int. Cl.
*H04J 3/04* (2006.01)
(52) U.S. Cl. ........................................ 370/535
(58) Field of Classification Search ........... 370/535, 370/476
See application file for complete search history.

(56) References Cited

U.S. PATENT DOCUMENTS

| | | | |
|---|---|---|---|
| 4,825,404 A | 4/1989 | Theus | |
| 5,446,845 A | 8/1995 | Arroyo et al. | |
| 5,475,857 A * | 12/1995 | Dally | 712/11 |
| 6,055,618 A * | 4/2000 | Thorson | 712/11 |
| 6,381,663 B1 | 4/2002 | Morrison et al. | |
| 6,526,469 B1 | 2/2003 | Drehmel et al. | |
| 6,532,515 B1 * | 3/2003 | Morein | 711/105 |
| 6,557,069 B1 * | 4/2003 | Drehmel et al. | 710/307 |
| 6,960,933 B1 * | 11/2005 | Cory et al. | 326/38 |
| 7,162,573 B2 | 1/2007 | Mehta | |
| 2001/0021969 A1 * | 9/2001 | Burger et al. | 711/207 |
| 2001/0046237 A1 * | 11/2001 | Chan et al. | 370/419 |
| 2002/0044560 A1 * | 4/2002 | Dally et al. | 370/401 |
| 2002/0129206 A1 * | 9/2002 | Khare et al. | 711/140 |
| 2003/0065500 A1 * | 4/2003 | Holaday et al. | 704/1 |
| 2003/0128051 A1 * | 7/2003 | Cliff et al. | 326/41 |
| 2003/0195990 A1 | 10/2003 | Greenblat | |
| 2004/0027163 A1 | 2/2004 | Carpenter et al. | |
| 2004/0091027 A1 | 5/2004 | Booth | |

(Continued)

FOREIGN PATENT DOCUMENTS

CN    1700700 A    11/2005

(Continued)

OTHER PUBLICATIONS

Office Action received for Chinese Patent Application No. 200410096571.6, mailed Nov. 28, 2008, 11 pages inclusive of English translation.

(Continued)

*Primary Examiner* — Kevin C. Harper
*Assistant Examiner* — Jianye Wu
(74) *Attorney, Agent, or Firm* — Caven & Aghevli LLC

(57) ABSTRACT

Embodiments of the invention provide an algorithm for dividing a link into one or more reduced-width links. For one embodiment of the invention, a multiplexing scheme is employed to effect a bit transmission order required by a particular cyclic redundancy check. The multiplexed output bits are then swizzled on-chip to reduce on-board routing congestion.

25 Claims, 8 Drawing Sheets

U.S. PATENT DOCUMENTS

| | | | | |
|---|---|---|---|---|
| 2004/0095967 | A1* | 5/2004 | Sharma | 370/537 |
| 2004/0153952 | A1* | 8/2004 | Sharma et al. | 714/781 |
| 2004/0160970 | A1* | 8/2004 | Dally et al. | 370/412 |
| 2005/0022065 | A1* | 1/2005 | Dixon et al. | 714/42 |
| 2005/0027880 | A1* | 2/2005 | Emmot | 709/238 |
| 2005/0259696 | A1* | 11/2005 | Steinman et al. | 370/535 |

FOREIGN PATENT DOCUMENTS

| | | |
|---|---|---|
| JP | 03121626 | 5/1991 |
| JP | 09036823 A2 | 2/1997 |
| TW | 0563021 B | 11/2003 |
| TW | 273404 | 2/2007 |
| TW | I311252 | 6/2009 |

OTHER PUBLICATIONS

Office Action received for Taiwan Patent Application No. 93125376, mailed Oct. 18, 2007, 14 pages inclusive of English Translation.

Office Action received for Taiwan Patent Application No. 93125376, mailed May 17, 2007, 4 pages inclusive of English Translation.

Office Action received for Taiwan Patent Application No. 93125376, mailed Jan. 30, 2008, 9 pages inclusive of English translation.

Non-Final Office Action received for U.S. Appl. No. 10/891,348, mailed on Oct. 3, 2008, 17 pages.

Final Office Action received for U.S. Appl. No. 10/891,348, mailed on Jun. 25, 2009, 17 pages.

"Initiatives and Technologies: PCI Express Provides Enterprise Reliability, Availability, and Serviceability", PCI Express Technology, Intel Corporation, 2003, pp. 4-7.

Bhatt, Ajay V., "Creating a Third Generation I/O Interconnect", Technology and Research Labs, Intel Corporation, 2002, pp. 1-8.

Office Action received for Russian Patent Application No. 2004130346, mailed on Oct. 28, 2005, 4 pages inclusive of English translation.

Office Action received for European Patent Application No. 04257160.4, mailed on Aug. 7, 2007, 5 pages.

European Search Report received for European Patent Application No. 04257160.4, mailed on Nov. 7, 2006, 4 pages.

Office Action received for Japanese Patent Application No. 2004-321189, mailed on Jun. 5, 2007, 7 pages inclusive of English translation.

Office Action received for the Japanese Application No. 2004-321189, mailed on Jan. 30, 2007, 8 pages inclusive of English Translation.

Office Action received for CN Patent Application No. 200410096571.6, mailed on Aug. 14, 2009, 15 pages of English Translation.

Notice of Allowance received for Russian Patent Application No. 2004130346, mailed on Jun. 6, 2006, 11 pages inclusive of English Translation.

Office Action received for U.S. Appl. No. 10/891,348, mailed on Sep. 23, 2009, 18 pages.

Office Action received for U.S. Appl. No. 10/891,348, mailed on May 11, 2010, 21 pages.

* cited by examiner

| Column Number | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| chunk 0 | C0 | C4 | I0 | I4 | I8 | I12 | I16 | I20 | I24 | I28 | I32 | I36 | I40 | I44 | I48 | I52 | I56 | I60 | I64 | I68 |
| chunk 1 | C1 | C5 | I1 | I5 | I9 | I13 | I17 | I21 | I25 | I29 | I33 | I37 | I41 | I45 | I49 | I53 | I57 | I61 | I65 | I69 |
| chunk 2 | C2 | C6 | I2 | I6 | I10 | I14 | I18 | I22 | I26 | I30 | I34 | I38 | I42 | I46 | I50 | I54 | I58 | I62 | I66 | I70 |
| chunk 3 | C3 | C7 | I3 | I7 | I11 | I15 | I19 | I23 | I27 | I31 | I35 | I39 | I43 | I47 | I51 | I55 | I59 | I63 | I67 | I71 |

C0–C7: CRC BITS

FIG. 1

| Column Number | 19 | 18 | 17 | 16 | 15 | 14 | 13 | 12 | 11 | 10 | 9 | 8 | 7 | 6 | 5 | 4 | 3 | 2 | 1 | 0 | CRC BITS | | | | | | |
|---|---|---|---|---|---|---|---|---|---|---|---|---|---|---|---|---|---|---|---|---|---|---|---|---|---|---|---|
| phit 0 | 0:19 | 0:18 | 0:17 | 0:16 | 0:15 | 0:14 | 0:13 | 0:12 | 0:11 | 0:10 | 0:9 | 0:8 | 0:7 | 0:6 | 0:5 | 0:4 | 0:3 | 0:2 | 0:1 | 0:0 | | | | | | | |
| phit 1 | 1:19 | 1:18 | 1:17 | 1:16 | 1:15 | 1:14 | 1:13 | 1:12 | 1:11 | 1:10 | 1:9 | 1:8 | 1:7 | 1:6 | 1:5 | 1:4 | 1:3 | 1:2 | 1:1 | 1:0 | | | | | | | |
| phit 2 | 2:19 | 2:18 | 2:17 | 2:16 | 2:15 | 2:14 | 2:13 | 2:12 | 2:11 | 2:10 | 2:9 | 2:8 | 2:7 | 2:6 | 2:5 | 2:4 | 2:3 | 2:2 | 2:1 | 2:0 | | | | | | | |
| phit 3 | 3:19 | 3:18 | 3:17 | 3:16 | 3:15 | 3:14 | 3:13 | 3:12 | 3:11 | 3:10 | 3:9 | 3:8 | 3:7 | 3:6 | 3:5 | 3:4 | 3:3 | 3:2 | 3:1 | 3:0 | | | | | | | |
| quadrant <q> | 3 | 2 | 1 | 0 | 3 | 2 | 1 | 0 | 3 | 2 | 1 | 0 | 3 | 2 | 1 | 0 | 3 | 2 | 1 | 0 | | | | | | | |
| quadrant <o> | 4 | 4 | 4 | 4 | 3 | 3 | 3 | 3 | 2 | 2 | 2 | 2 | 1 | 1 | 1 | 1 | 0 | 0 | 0 | 0 | | | | | | | |

FIG. 1A

| Column Number | 9 | 8 | 7 | 6 | 5 | 4 | 3 | 2 | 1 | 0 | |
|---|---|---|---|---|---|---|---|---|---|---|---|
| phit 0 | 0:18 | 0:16 | 0:14 | 0:12 | 0:10 | 0:8 | 0:6 | 0:4 | 0:2 | 0:0 | CRC BITS |
| phit 1 | 1:18 | 1:16 | 1:14 | 1:12 | 1:10 | 1:8 | 1:6 | 1:4 | 1:2 | 1:0 | |
| phit 2 | 0:19 | 0:17 | 0:15 | 0:13 | 0:11 | 0:9 | 0:7 | 0:5 | 0:3 | 0:1 | |
| phit 3 | 1:19 | 1:17 | 1:15 | 1:13 | 1:11 | 1:9 | 1:7 | 1:5 | 1:3 | 1:1 | |
| phit 4 | 2:18 | 2:16 | 2:14 | 2:12 | 2:10 | 2:8 | 2:6 | 2:4 | 2:2 | 2:0 | |
| phit 5 | 3:18 | 3:16 | 3:14 | 3:12 | 3:10 | 3:8 | 3:6 | 3:4 | 3:2 | 3:0 | |
| phit 6 | 2:19 | 2:17 | 2:15 | 2:13 | 2:11 | 2:9 | 2:7 | 2:5 | 2:3 | 2:1 | |
| phit 7 | 3:19 | 3:17 | 3:15 | 3:13 | 3:11 | 3:9 | 3:7 | 3:5 | 3:3 | 3:1 | |
| quadrant<q> | Y | X | Y | X | Y | X | Y | X | Y | X | |
| quadrant<o> | 4 | 4 | 3 | 3 | 2 | 2 | 1 | 1 | 0 | 0 | |

FIG. 2

METHODS AND APPARATUSES TO EFFECT A VARIABLE-WIDTH LINK

FIELD

Embodiments of the invention relate generally to the field of processing systems employing a link-based interconnection scheme, and more specifically to methods and apparatuses to effect the logical decomposition of a single link interface into quadrants such that variable link width, lane reversal, and port bifurcation features are supported.

BACKGROUND

To address the disadvantages of bus-based interconnection schemes for multiple-processor systems (MPSs), point-to-point, link-based interconnection schemes have been developed. Each node of such a system includes an agent (e.g., processor, memory controller, I/O hub component, chipsets, etc.) and a router for communicating data between connected nodes. The agents of such systems communicate data through use of an interconnection hierarchy that typically includes a protocol layer, an optional routing layer, a link layer, and a physical layer.

The protocol layer sets the format for the protocol transaction packet (PTP), which constitutes the unit of data that is communicated between nodes. The routing layer determines a path over which data is communicated between nodes. The link layer receives the PTPs from the protocol layer and communicates them in a sequence of chunks (portions). The size of each portion is determined by the link layer and represents a portion of a PTP whose transfer must be synchronized, hence each portion is known as a flow control unit (flit). A PTP is comprised of an integral and variable number of flits. The physical layer consists of the actual electronics and signaling mechanisms at each node. In point-to-point, link-based interconnection schemes, there are only two agents connected to each link. This limited electronic loading results in increased operating speeds. Operating speeds can be increased further by reducing the width of the physical layer interface (PLI), and thus, the clock variation. The PLI is, therefore, typically designed to communicate some fraction of a flit on each of several clock cycles. The fraction of a flit that can be transferred across a physical interface in single clock cycle is known as a physical control digit (phit). While flits represent logical units of data, a phit corresponds to a physical quantity of data.

The interconnection hierarchy is implemented to achieve greater system operating speed at the physical layer. The link layer is transmitting data (received as PTPs from the protocol layer) in flits, which are then decomposed into phits at the physical layer and are communicated over the PLI to the physical layer of a receiving agent. The received phits are integrated into flits at the physical layer of the receiving agent and forwarded to the link layer of the receiving agent, which combines the flits into PTPs and forwards the PTPs to the protocol layer of the receiving agent.

This method of transmitting data across the link leads to several difficulties in implementing a variable-width link (e.g., a reduced-width link).

Typical prior art interconnection schemes (e.g., PCI Express) use data packets. The transmitting agent (Tx) transmits one byte of a data packet on each lane of the link during each clock cycle. The packet has a "start-of-packet" (SOP) and an "end-of-packet" (EOP) indicator. During initialization the receiving agent (Rx) uses a training sequence to determine the number of lanes available. The Rx sequentially takes one byte from each available lane and assembles the bytes until an EOP indicator is received.

This scheme, referred to as "byte serial fashion per lane", allows for a link to be reduced to an arbitrary number of lanes. However, implementing such a scheme on a point-to-point link-based PLI, designed to communicate some fraction of a flit on each of several clock cycles, may lead to unacceptable latency. For example, such a system may use an 80-bit flit and transmit the flit over a 20-lane, full-width, link in four clock cycles. That is, one bit is transmitted on each of the 20 lanes for each clock cycle. For such a system, if a byte were to be transmitted sequentially on each of the 20 lanes, it would take 8 clock cycles to transmit 160 bits, which would be the equivalent of increasing the size of the flit. That is, one 80-bit flit could not be forwarded until the entire 160 bits had arrived at the Rx. This added latency may be unacceptable for such systems. Moreover, such systems do not need to include SOP and EOP indicators as such, and these would have to be added to implement a byte serial fashion per lane transmission scheme.

Additional considerations arise in developing a reduced-width link implementation method that accommodates other features supported by the PLI.

BRIEF DESCRIPTION OF THE DRAWINGS

The invention may be best understood by referring to the following description and accompanying drawings that are used to illustrate embodiments of the invention. In the drawings:

FIG. 1 illustrates the flit format and ordering of eight CRC bits within an 80-bit flit divided into four chunks in accordance with one embodiment of the invention;

FIG. 1A illustrates the flit format of the 80-bit flit of FIG. 1 divided into four phits, phit0-phit3, for transmission on a full-width link in accordance with one embodiment of the invention;

FIG. 2 illustrates the flit format for an 80-bit flit divided into eight phits for transmission on a half-width link in accordance with one embodiment of the invention;

DETAILED DESCRIPTION

Figure 3:
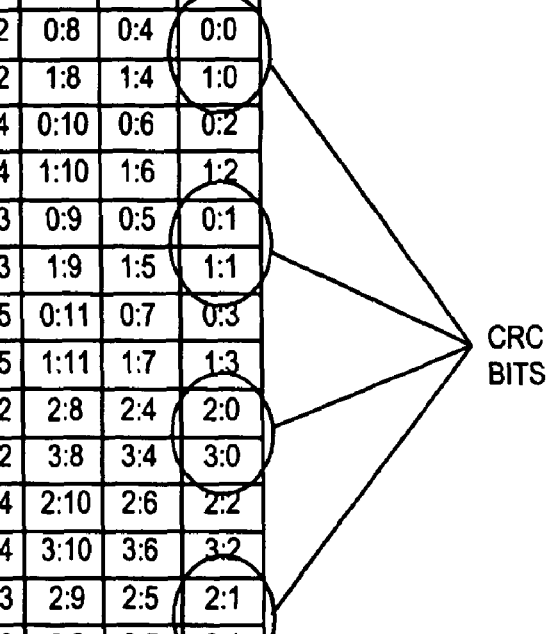
FIG. 3 illustrates the flit format for an 80-bit flit divided into sixteen phits for transmission on a quarter-width link in accordance with one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Flit Format

One embodiment of the invention provides a PLI having a 20-lane link (at full-width) that transmits an 80-bit flit, as four 20-bit phits. For one embodiment of the invention, the 20 lanes are divided into quadrants of five lanes each. For such an embodiment, a reduced-width link may be comprised of any combination of two quadrants for a half-width link, or any one of the quadrants for a quarter-width link. That is, such an embodiment does not support arbitrary link width, but only full-width (20 lanes), half-width (10-lanes) and quarter-width (5 lanes). At full-width, the link transmits an 80-bit flit as four 20-bit phits in four clock cycles; at half-width, the link transmits an 80-bit flit as eight 10-bit phits in eight clock cycles; and at quarter-width, the link transmits an 80-bit flit as sixteen 5-bit phits in sixteen clock cycles.

The 80-bit flit contains several (e.g., eight) error detection bits to effect a cyclic redundancy check (CRC). A CRC is a method for detecting errors in data that has been transmitted over a communications link. Typically, a Tx applies a polynomial to a block of data and appends the resulting CRC code to the block. The Rx applies the same polynomial and compares its result to the appended result. If they agree, the data has been received successfully, if not, the Tx is notified to retransmit the data.

The CRC bits of the flit are required to be transmitted in a specific order based upon the mathematics used to implement the CRC. For one embodiment, the transmission of phits, and bits within each phit, are required to follow a specific order to effectively use CRC burst error detection capabilities of the link layer. The transmission order depends upon the link width in use. FIG. 1 illustrates the flit format and ordering of eight CRC bits within an 80-bit flit divided into four chunks in accordance with one embodiment of the invention. As shown in FIG. 1, the flit illustrated contains four 20-bit chunks, chunk0-chunk3, with eight CRC bits, bits C0-C8. To effect a CRC, the CRC bits are transmitted in a specified order. CRC bits C0 and C4 are included in chunk0, C1 and C5 are included in chunk1, C2 and C6 are included in chunk2, and C3 and C7 are included in chunk3.

FIG. 1A illustrates the flit format of the 80-bit flit of FIG. 1 divided into four phits, phit0-phit3, for transmission on a full-width link in accordance with one embodiment of the invention. As shown in FIG. 1, for a full-width link having 20 lanes, each chunk of the flit corresponds to a phit. FIG. 1A represents each bit as an ordered pair <q, o>, where "q" designates the quadrant the bit belongs to and "o" designates the offset of the bit within the quadrant. As shown in FIG. 1A, the eight CRC bits are contained in columns (bit positions) 0 and 1 of each of the four phits, phit0-phit3.

A half-width link transmits an 80-bit flit as eight 10-bit flits in eight clock cycles using any combination of two quadrants. The eight phits are not constituted of simply the first and second halves of each of the four chunk of the flit. In order to meet the requirements of the CRC algorithm, the flit format for a half-width link interleaves the bits of the flit such that the eight CRC bits are in the first bit position of each of the eight phits. FIG. 2 illustrates the flit format for an 80-bit flit divided into eight phits for transmission on a half-width link in accordance with one embodiment of the invention. As shown in FIG. 2, the first of the eight phits, phit0 is comprised of alternate bits of the first chunk of the flit; the second of the eight phits, phit1 is comprised of alternate bits of the second chunk; the third of the eight phits, phit2 is comprised of the remaining alternate bits of the first chunk (those not included in phit0); and so on. That is, phit0 comprises even columns of chunk0 and phit1 comprises even columns of chunk1. The next two phits, phit2 and phit3, comprise the odd columns of chunk0 and chunk1, respectively. Thus, phit0-phit3 are used to completely transmit chunk0 and chunk 1. Phit4-phit7 are then used to transmit chunk2 and chunk3 by repeating the process. This ordering allows the eight CRC bits to be positioned in the first bit position of each of the eight phits as shown.

For a half-width link, only two of the four lane quadrants are used. The two quadrants used can be any combination, <x, y> of the four quadrants as shown in FIG. 2. For one embodiment of the invention, the quadrant with the lower "q" value, of the two quadrants chosen, transmits the bit with the lower column number (bit position within the phit). For example, for the flit format shown in FIG. 2, y>x.

A quarter-width link transmits an 80-bit flit as sixteen 5-bit phits in sixteen clock cycles using any one of the lane quadrants. Again, the bits within the flit must be specifically ordered to CRC requirements. FIG. 3 illustrates the flit format for an 80-bit flit divided into sixteen phits for transmission on a quarter-width link in accordance with one embodiment of the invention. As shown in FIG. 3, the eight CRC bits are in the first bit position of alternating pairs of phits. The sixteen phits are formed through a process similar to that described above in reference to FIG. 2. That is, phit0 is comprised of 5 bits from chunk0 starting with column0 and including every fourth bit. Phit1 comprises 5 bits from chunk1 starting with column0 and including every fourth bit. Phit2-phit7 interleave the bits of chunk0 and chunk1, comprising five bits per chunk, selecting every fourth bit starting with columns 2, 1, and 3, in that particular order. Thus, phit0-phit7 are used to completely transmit chunk0 and chunk1. Phit8-phit15 are then used to transmit chunk2 and chunk3 by repeating the process.

Nibble Muxing

Figure 4:
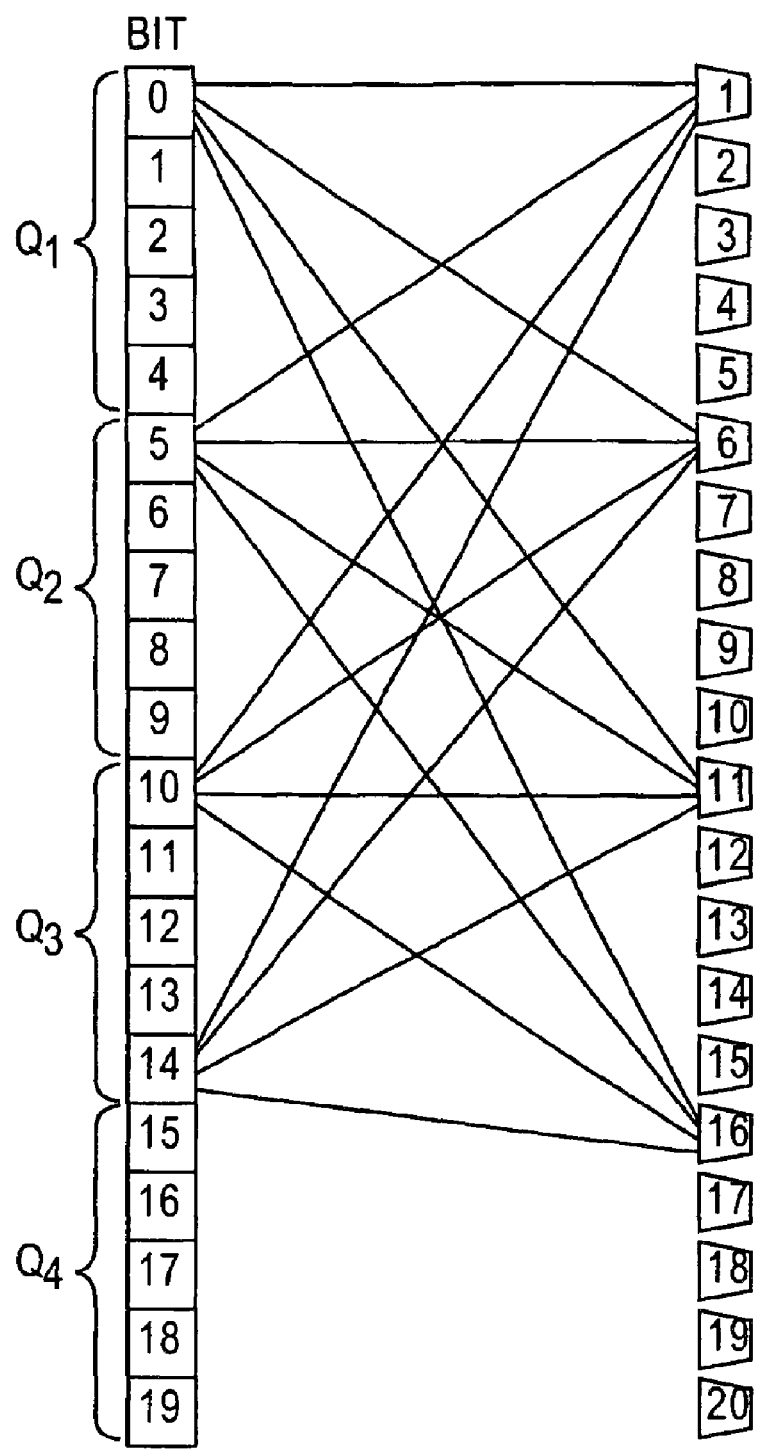
FIG. 4 illustrates the on-chip routing congestion and variable delay inherent in a direct routing scheme providing variable-width links in accordance with one embodiment of the invention.

A direct routing of the bits in the order required for CRC would lead to long trace lengths causing routing congestion and variable delay. FIG. 4 illustrates the on-chip routing congestion and variable delay inherent in a direct routing scheme providing variable-width links in accordance with one embodiment of the invention. As shown in FIG. 4, the bits from 20 lanes are divided into quadrants of five lanes each. One bit from each of the quadrants Q1-Q4 is directed to four of the 20 muxes, mux1-mux20. For example, as shown in FIG. 4, each of bits 0, 5, 10 and 15 (the first bit of each quadrant) are directed to each of muxes 1, 6, 11, and 16. This pattern is continued with each of bits 1, 6, 11 and 16 (the second bit of each quadrant) directed to each of muxes 2, 7, 12, and 17, etc. Each of the muxes receives four input bits and provides outputs based upon the link width, that is, for a full-width (20-bits) link, each of the 20 muxes provides an output with mux1 providing the output for bit 0, etc. For a half-width link, only 10 of the 20 muxes provide an output per clock cycle for a total output of 10 bits per clock cycle. For example mux1 may provide output from bits 0 and 10 on each of two successive clock cycles respectively, and mux6 may provide output from bits 5 and 15 on each of the two successive clock cycles, respectively, where quadrants Q1 and Q2 are used. Where quadrants Q3 and Q4 are used, mux11 may provide output from bits 0 and 10 on each of two successive clock cycles respectively, and mux16 may provide output from bits 5 and 15 on each of the two successive clock cycles, respectively. For a quarter-width link, only 5 of the 20 muxes provide an output per clock cycle for a total output of 5 bits per clock cycle. For example mux1 may provide output from bits 0, 5, 10 and 15 on each of four successive clock cycles respectively (where quadrant Q1 is used).

A comparison of the trace lengths in accordance with such a scheme illustrates the variable delay. Such variability in trace length could necessitate buffering.

In order to effect the bit transmission order required for CRC while avoiding such drawbacks, an integrated multiplexer (Mux) is provided for each lane of the PLI in accordance with one embodiment of the invention. For a 20-lane PLI, 20 muxes are integrated.

Figure 5:
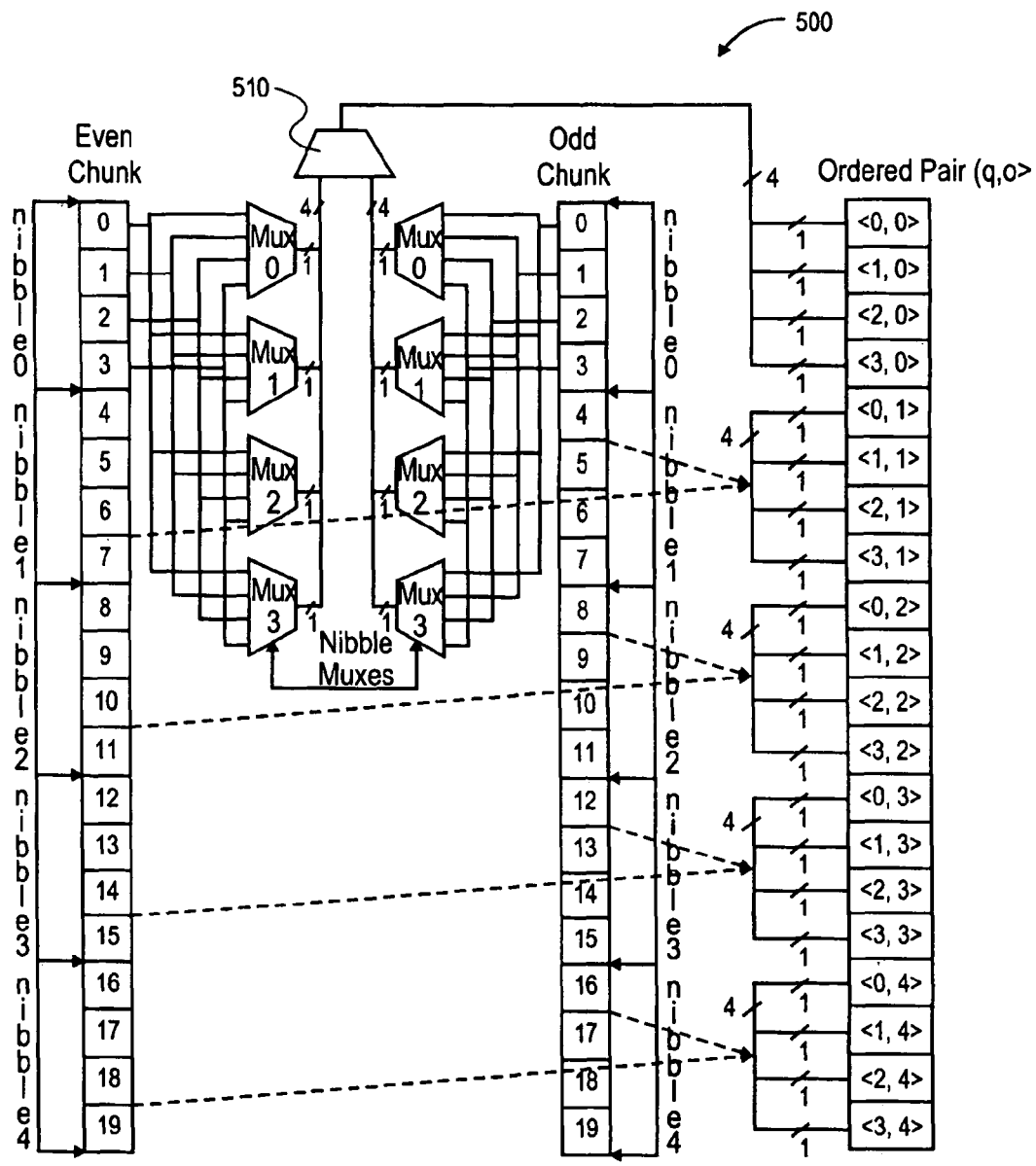
FIG. 5 illustrates a multiplexer input scheme to effect required phit and bit transmission order in accordance with one embodiment of the invention.

FIG. 5 illustrates a multiplexer input scheme to effect required phit and bit transmission order in accordance with one embodiment of the invention. Mux input scheme 500 divides a 20-bit chunk into five nibbles, nibble0-nibble4, of four bits each. The multiplexing scheme to address the transmission order restrictions imposed by CRC are discussed for nibble0.

For a full-width link, the mux input selection is straightforward; 20 muxes are implemented for each of the odd and even chunks. For a full-width link, each of 20 muxes (one mux associated with each input) are active, and each mux receives its corresponding input on a nibble by nibble basis. As shown in FIG. 5, the bits of nibble0, bit0-bit3, are each input to four corresponding muxes, mux0-mux3. These bits have an offset of 0 in each quadrant. All of the nibbles of chunk0, as exemplified by nibble0 of chunk0 are transmitted as phit0 and all of the nibbles of chunk1 (exemplified by nibble0 of chunk0) are transmitted as phit1. Transmission of the chunks is interleaved through chunk mux 510.

The operation is repeated for chunks 2 and 3 for the next two phits.

For a half-width link, two quadrants, designated Qy and Qx are used and therefore only two of the four muxes associated with each nibble are used for a total of ten active muxes. Nibble0 of chunk0 and chunk1 is transmitted in the first four of the eight phits using bits<x, 0> and <y, 0>. In phit 0, Qx Qy transmit bits 0 and 2 of chunk0 (as well as bits 4, 8, 12, and 16, and bits 6, 10, 14, and 18), respectively. In phit1, Qx and Qy switch to chunk1 and transmit bits 0 and 2 (as well as bits 4, 8, 12, and 16, and bits 6, 10, 14, and 18), respectively. This operation is repeated for bits 1 and 3 (as well as bits 5, 9, 13, and 17 and bits 7, 11, 15, and 19) of chunk0 and chunk1 for a total of four phits. The next four phits repeat the operation for chunks 2 and 3.

As noted above, for quadrant pair Qy and Qx, the value of x is less than y. For example, if quadrants 1 and 0 are used to form a half-width link, quadrants transmits bits 0 and 1 of each chunk in successive phits and quadrant1 transmits bits 2 and 3 in successive phits. On the other hand, if quadrants 1 and 2 are used, quadrant1 transmits bits 0 and 1 of each chunk in successive phits and quadrant2 transmits bits 2 and 3 in successive phits.

For a quarter-width link, one of the quadrants Qx is used, and therefore, only one of the muxes associated with each nibble is used for a total of five active muxes. Nibble0 of chunk0 and chunk1 is transmitted in the first eight of the sixteen phits using <x, 0>. Bit 0 of chunk0 (as well as bits 4, 8, 12, and 16) is transmitted in phit0 and bit 0 of chunk1 (as well as bits 4, 8, 12, and 16) is transmitted in phit1. The operation is repeated three times using bits 2, 1, and 3 of nibble0 (and the corresponding bits of each other nibble), respectively, for each iteration while interleaving chunks 0 and 1 for a total of eight phits for the two chunks. The operation is repeated for chunks 2 and 3 using the next eight phits.

After transmission, the received bits are demuxed at the Rx port using a scheme that effects the opposite of the described muxing scheme and provides a demuxing of the bits and phits.

Swizzling

An embodiment of the invention implementing nibble muxing, as described above, reduces on-chip routing congestion and variable line length by providing muxes that are highly localized, on-chip, relative to their associated inputs. Maintaining the required transmission order for phits and bits within each phit may result in related difficulties because when operating a reduced-width link (either a half-width link or a quarter-width link for one embodiment of the invention), the phit is not transmitted across the link on contiguous physical lanes. That is, the implementation of the nibble muxing scheme directs the output of each of the four mux corresponding to a given nibble to a distinct quadrant. This can be problematic in a system supporting various features.

For example, consider the supported feature of port bifurcation. Port bifurcation allows a full-width agent to be divided into two agents each with half-width links. For example, for some system platforms, the traffic on the I/O is not as much as the traffic between processors. Therefore, for a system with two processors, instead of each processor having its own dedicated I/O component, it is possible for the two processors to share a single I/O component in terms of interconnections. In such case, the two processors communicate with each other using a 20-bit wide interconnect (20 lanes), but the I/O agent allocates 10 of its 20 lanes to communication with one processor and the other 10 lanes to communication with the other processor. For one embodiment of the invention, port bifurcation is effected through pin straps prior to link initialization and the configuration remains static. For one embodiment of the invention, the bifurcated port has two clock lanes (one for each half-width link) at the center of the pin field. For one embodiment of the invention, a port capable of bifurcation is also capable of operating as a single full-width link. For such an embodiment, the extra clock pin may be unconnected or may be hardwired to either Vcc or Vss.

Figure 6:
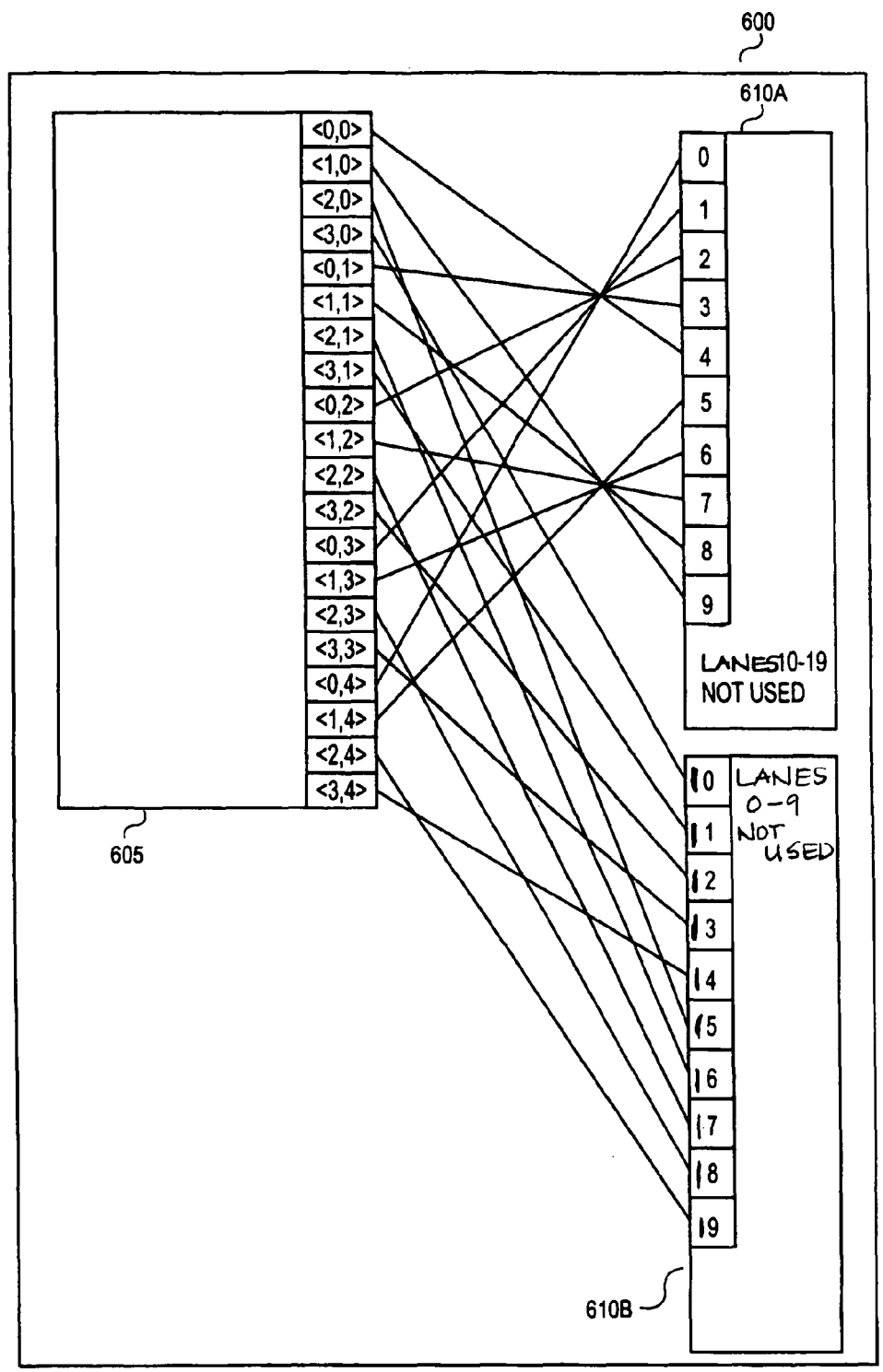
FIG. 6 illustrates the board layout for a system implementing nibble muxing to effect a desired bit transmission order while supporting a bifurcated port in accordance with one embodiment of the invention.

FIG. 6 illustrates the board layout for a system implementing nibble muxing to effect a desired bit transmission order while supporting a bifurcated port in accordance with one embodiment of the invention. System 600, shown in FIG. 6, includes a Tx agent 605 effecting the desired transmission order resulting from nibble muxing, as described above, in reference to FIG. 5. As shown, agent 605 has a bifurcated port. System 600 also includes two agents 610A and 610B each having a half-width port. Of the 20 lanes available on each of agents 610A and 610B, half are inactive. On agent 610A, the half-width port uses lanes 0-9, while on agent 610B, the half-width port uses lanes 10-19. As shown in FIG. 6, quadrants 0 and 1 of agent 605 are directed to agent 610A while quadrants 2 and 3 are directed to agent 610B. This layout would have excessive wire crossover on the board, as shown in FIG. 6, or alternatively, require additional routing layers, both of which are undesirable.

To address this situation, a bit swizzling layer is implemented between the internal logic and the physical lanes for one embodiment of the invention.

Figure 7:
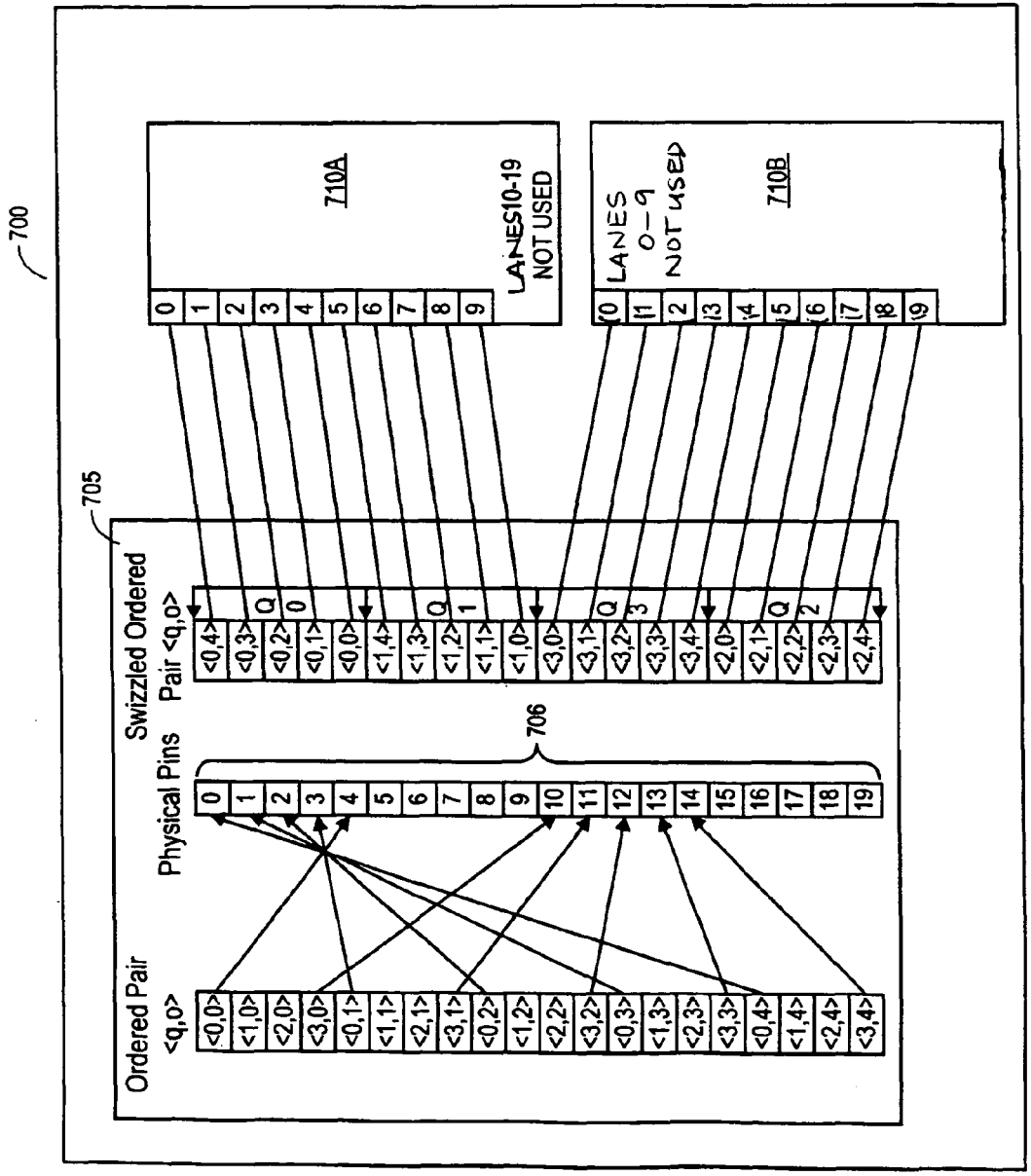
FIG. 7 illustrates the implementation of a bit swizzling scheme in accordance with one embodiment of the invention.

FIG. 7 illustrates the implementation of a bit swizzling scheme in accordance with one embodiment of the invention. System 700, shown in FIG. 7, includes agent 705 having a bit swizzling scheme implemented between the internal logic and the physical pins 706. The bit swizzling results in quadrants that have all bits transmitted on contiguous physical lanes. For one embodiment of the invention, the bit swizzling is implemented through hard wiring on the die, and therefore, does not require additional logic. As shown in FIG. 7, for one embodiment of the invention, a bit represented using an ordered pair <q, o> is mapped to a physical lane "n" using the following swizzling equation.

$$\text{Lane } n = (N_L/4)*(1+q) - o - 1 \text{ for } q < 2; \text{ and}$$
$$= (N_L/4)*(5-q) + o \quad \text{for } q >= 2;$$

where, 'n' is the lane number (0 through $N_L$–1), '$N_L$' is the number of lanes for a full-width link (e.g., 20 lanes), 'q' is the quadrant number (0 through 3), and 'o' is the bit offset (0 through 4) within quadrant 'q'. By swizzling the bits internally, thereby, forcing all of the bits of a quadrant to be transmitted on contiguous physical lanes, the on-board routing congestion of a bifurcated port is alleviated. The port of agent 705 can be bifurcated, as shown, with quadrants 0 and 1 directed to the half-width port of agent 710A and quadrants 2 and 3 directed to the half-width port of agent 710. The order of the quadrants after implementation of the described swizzling scheme is not sequential at the physical pins 706, but the connection to agents 710A and 710B can be made directly without additional routing layers.

General Matters

Embodiments of the invention provide an algorithm for dividing a link into one or more reduced-width links. Though described above in reference to a PLI having a full width link of 20 lanes, an 80-bit flit size, and reduced-width links of half-width and quarter-width, alternative embodiments of the invention apply equally to PLIs having different sized links, flits, and providing a variety of reduced-width links.

For one embodiment, the highly localized muxes resulting from the nibble muxing process described above in reference to FIG. 5 relieves on-chip congestion in a highly congested area of the chip. The bit-swizzling described above in reference to FIG. 6 increases on-chip congestion (in a less congested area where the increased congestion can be tolerated), but alleviates on-board congestion allowing the system to better support the features of port bifurcation and lane reversal.

Lane Reversal

Implementation of a multiplexing and swizzle scheme, as described above, provides an added benefit in regard to lane reversal.

Ideally, pins providing the physical signals on each of two interconnected agents are connected to the corresponding pin on the other agent. That is, for a pair of 20-pin agents, pins 0-19 on one agent are connected to pins 0-19 on the other agent. Such connection may lead to excessive board layout congestion or complexity for some topologies. An embodiment of the invention allows pins on one port to be reversed with respect to the pins on the other port. Such lane reversal is defined by the following pin connection equation between two ports, A and B.

$$\text{Pin } k_{component\ A} => \text{Pin}(N_L-k-1)_{component\ B}$$

Lane reversal is automatically detected and compensated for by the Rx port. No additional steps are required on the board as long as the agents are connected through corresponding pins (straight connection) or through the above-noted pin connection equation for lane reversal.

For one embodiment of the invention in which the feature of lane reversal is supported in conjunction with port bifurcation, lanes 0-9 of a 20-lane bifurcated port are connected to lanes 19-10 (in that particular order) of a first half width port, while lanes 10-19 of the 20-lane bifurcated port are connected to lanes 9-0 (in that particular order) of a second half-width port.

For one embodiment of the invention, employing the muxing and swizzling scheme described above, the lane identifiers for each lane of a straight connection differ in only one bit from the lane identifiers of a reversed lane connection. That is, since the lanes are restricted to one of only two locations, their identifiers can be the same except for one bit. In such an embodiment, lane reversal can be detected by comparing the single bit. This saves time and chip space as lane reversal can be indicated by reference to a single bit of the lane identifier, thus only a single bit comparator need be implemented on the chip to support lane reversal. In contrast, prior art schemes required the comparison of all five bits of the lane identifier and thus a five-bit comparator was required.

Embodiments of the invention provide a multiplexing and swizzling process to effect a desired bit transmission order and facilitate a reduced-width link while supporting other desired features. These processes include various operations and are described in their most basic form, but operations can be added to or deleted from any of these processes without departing from the basic scope of the invention. The operations of various embodiments of the invention may be effected by hardware components or may be embodied in machine-executable instructions as described above. Alternatively, they may be performed by a combination of hardware and software. An embodiment of the invention may be provided as a computer program product that may include a machine-accessible medium having stored thereon instructions, which may be used to program a computer (or other electronic devices) to perform a process according to the invention as described above.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    dividing, at a dividing unit, bits of a flit into a plurality of groups, each group of the plurality of groups having an equal number of the bits, wherein the flit is to represent a portion of a data packet whose transfer is synchronized;

multiplexing, at a plurality of multiplexers, the bits of each group of the plurality of groups independently to effect a transmission order of the bits of the flit on a link by inputting each bit of a group of the plurality of groups of the flit into each of the plurality of multiplexers; and dividing transmission lanes of the link into a number of transmission lane divisions, wherein the multiplexed bits from each group of the plurality of groups are to form a phit having a number of bits equal to a total number of transmission lanes in all of active transmission lane divisions.

2. The method of claim 1 wherein each of the one or more corresponding multiplexers is associated with a distinct one of the transmission lane divisions.

3. The method of claim 1 wherein each group has four bits.

4. The method of claim 2 wherein each transmission lane division is a transmission lane quadrant.

5. The method of claim 4 wherein each transmission lane quadrant has five transmission lanes.

6. The method of claim 5 wherein the multiplexed bits are swizzled such that each output bit is transmitted from a contiguous physical transmission lane.

7. The method of claim 1 wherein the desired transmission order facilitates a particular cyclic redundancy check.

8. A system for providing a variable-width link comprising:
a port dividing unit that divides data transmission lanes of a port of the link into quadrants, at least one of the quadrants active;
a transmission unit for transmitting a flit as a plurality of phits, wherein the flit is to represent a portion of a data packet whose transfer is synchronized, each phit of the plurality of phits having a number of bits equal to the total number of the data transmission lanes within all of the active quadrants; and
a first of sets of multiplexers associated with a first group of the bits, such that a first bit of the first group is input to the first set of the multiplexers to form a first phit, and
a second set of multiplexers associated with a second group of the bits, such that a second bit of the second group is input to the second set of multiplexers to form a second phit, such that the first phit and the second phit within the flit are transmitted successively over the link to facilitate a cyclic redundancy check,
wherein transmission lanes of the link are to be divided into a number of transmission lane divisions such that multiplexed bits from each group of a plurality of groups of bits of the flit are to form a phit having a number of bits equal to a total number of transmission lanes in all of active transmission lane divisions, wherein the phits of the flit and the bits of a phit of the plurality of the phits are transmitted across the link in a specified bit transmission order by inputting each bit of a group of the plurality of groups of the flit into each of the first and second sets of multiplexers.

9. The system of claim 8 wherein the specified bit transmission order is selected to effect a cyclic redundancy check.

10. The system of claim 8 wherein an output of each set of the multiplexers forms the phit of the plurality of phits.

11. The system of claim 8 wherein the bits input to each of the multiplexers are swizzled such that a set of output bits from the multiplexers is transmitted from a set of contiguous physical transmission lanes.

12. The system of claim 8 wherein the port is bifurcated.

13. An article of manufacture comprising:
a non-transitory machine-accessible storage medium having associated data, wherein the data, when accessed, results in a machine performing operations to effect initialization of a physical layer link between two agents comprising:
dividing data transmission lanes of a port of a link into quadrants, at least one of the quadrants active;
transmitting a flit as a plurality of phits, each phit of the plurality of phits having a number of bits equal to the total number of the data transmission lanes within all of the active quadrants to facilitate a cyclic redundancy check;
inputting a first bit of a first group of bits into a first set of multiplexers to form a first phit;
inputting a second bit of a second group of bits into a second set of multiplexers to form a second phit, such that the first phit and the second phit within the flit are transmitted in a transmission order by inputting each bit of a group of a plurality of groups of the flit into each of the first and second sets of multiplexers; and
dividing transmission lanes of the link in to a number of transmission lane divisions such that multiplexed bits form each group of a plurality of groups of bits of the flit are to form a phit having a number of bits equal to a total number of transmission lanes in all of active transmission lane divisions.

14. The article of manufacture of claim 13 wherein the phits of a flit and the bits of a phit are transmitted across the link in a specified bit transmission order.

15. The article of manufacture of claim 13 wherein the specified bit transmission order is selected to effect a cyclic redundancy check.

16. The article of manufacture of claim 15 wherein each set of the plurality of sets of multiplexers is associated with a group of bits, the bits of each group input to each of the multiplexers of the associated set of multiplexers.

17. The article of manufacture of claim 16 wherein an output of each set of multiplexers form a phit.

18. The article of manufacture of claim 16 wherein the bits input to each of the multiplexers are swizzled such that a set of output bits from the multiplexers is transmitted from a contiguous physical transmission lane.

19. A system comprising:
a transmitting agent having a plurality of data transmission lanes of a link divided into quadrants, at least one quadrant active, the transmitting agent having a first set of multiplexers to receive a first bit of first data; multiplex the first bit, an output of the first set of multiplexers forming a first phit,
a second set of multiplexers to receive a second bit of second data, multiplex the second bit, the output of the second set of multiplexers forming a second phit, such that the first phit and the second phit within a flit are transmitted from the output of the first set of multiplexers and the second set of multiplexers in a corresponding clock cycle over the transmission lanes of the active quadrants to facilitate a cyclic redundancy check; and
a receiving agent interconnected to the transmitting agent through a point-to-point link-based interconnection scheme to receive the transmitted phits,
wherein transmission lanes of the link are to be divided into a number of transmission lane divisions such that multiplexed bits from each group of a plurality of groups of bits of the flit are to form a phit having a number of bits equal to a total number of transmission lanes in all of active transmission lane divisions, wherein the phits of the flit and the bits of a phit of the plurality of the phits are transmitted across the link in a specified bit transmission order by inputting each bit of a group of the plurality of groups of the flit into each of the first and second sets of multiplexers.

20. The system of claim 19 wherein the transmitting agent and the receiving agent are components selected from the group consisting of a processor, a memory controller, an input/output hub component, a chipset, and combinations thereof.

21. The system of claim 20 wherein the data is multiplexed to effect a cyclic redundancy check.

22. The system of claim 19 wherein the output of each group of multiplexers is swizzled such that output bits from each of the groups of multiplexers are transmitted from a set of contiguous physical transmission lanes.

23. The system of claim 22 wherein a plurality of data transmission lanes of the receiving agent are connected to the plurality of data transmission lanes of the transmitting agent in a reverse order.

24. The system of claim 23 wherein the reverse order is indicated by a single bit of a data transmission lane identifier for each data transmission lane.

25. The system of claim 22 wherein the receiving agent includes a second plurality of groups of multiplexers to receive data and demultiplex the data.

* * * * *